United States Patent [19]

Castro et al.

[11] Patent Number: 5,557,928
[45] Date of Patent: Sep. 24, 1996

[54] TUBE ROCKET THRUST CHAMBER CONSTRUCTION AND METHOD

[75] Inventors: Jaoquin H. Castro, West Palm Beach; Samuel S. Owen, Palm Beach Gardens, both of Fla.; Salvatore Santangelo, So. Windsor, Conn.

[73] Assignee: United Technologies Corporation, Hartford, Conn.

[21] Appl. No.: 291,385

[22] Filed: Aug. 16, 1994

[51] Int. Cl.⁶ .................................................. F02K 11/00
[52] U.S. Cl. .............................................. 60/260; 60/267
[58] Field of Search ............................. 60/257, 259, 260, 60/267

[56] References Cited

U.S. PATENT DOCUMENTS

| | | | |
|---|---|---|---|
| 2,956,399 | 10/1960 | Beighley | 60/257 |
| 2,991,617 | 7/1961 | Nerad et al. | 60/257 |
| 3,516,254 | 6/1970 | Hammond | 60/260 |
| 3,690,103 | 9/1972 | Dederra et al. | 60/267 |
| 3,713,293 | 1/1973 | Simon | 60/267 |
| 3,768,256 | 10/1973 | Butter et al. | 60/267 |
| 3,782,118 | 1/1974 | Butter et al. | 60/267 |
| 3,835,644 | 9/1974 | Butter et al. | 60/267 |
| 4,107,919 | 8/1978 | Sokolowski | 60/267 |
| 4,781,019 | 11/1988 | Wagner | 60/267 |
| 4,912,925 | 4/1990 | Foust | 60/259 |
| 5,267,437 | 12/1993 | Foust | 60/259 |

*Primary Examiner*—Timothy S. Thorpe
*Attorney, Agent, or Firm*—Norman Friedland

[57] ABSTRACT

Each of the tubes of the tube thrust chamber of a rocket engine is hooked at either end with the end at the outlet oriented horizontally relative to the rocket engine's center line and the end at the inlet oriented vertically and bent outwardly away from the rocket thrust chamber and facing the outlet for fitting into apertures formed in the outlet and inlet manifolds. The method of construction and assembly is manifested by assembling the sub-assembly of the wedge ring/manifold above the open ends of the vertical portion of the tubes and lowering the assembled wedge ring/manifold so that each tube fits into complementary apertures formed in the inlet manifold and the wedge ring tightly fits onto the outer periphery of the tubes and brazing this assembly in situ. A skirt extends below the thrust chamber and includes a planar surface for resting on ground to support the thrust chamber in an upright position.

12 Claims, 3 Drawing Sheets

TUBE ROCKET THRUST CHAMBER CONSTRUCTION AND METHOD

TECHNICAL FIELD

This invention relates to liquid rocket engines and particularly to the construction of the tubes of the tube thrust cheer of the liquid rocket engine and method of assembly.

BACKGROUND ART

This invention is an improvement of the liquid rocket engine of the type that utilizes liquid propellant, which may be a cryogenic propellant (liquid hydrogen and liquid oxygen) or other liquid propellants which are typically used for rocket engines. And more particularly, this invention constitutes an improvement over the class of engines identified as the RL10 rocket engines and other types of liquid rocket engines manufactured by Pratt & Whitney a division of United Technologies Corporation, the assignee common to the assignee of this patent application.

As is well known in this field of technology, the RL10 family of liquid rocket engines utilize a plurality of tubes that are joined together to conform to the contour of the thrust chamber which consists of a combustion chamber and a nozzle. Each tube extends from the entrance of the combustion chamber to the discharge end of the nozzle. The tubes are parallely disposed relative to each other and are joined such as by welding or brazing to form the thrust chamber assembly. The diameter of the tubes may vary. The extremely cold liquid hydrogen from the hydrogen pump(s) is pumped through these tubes which flows in indirect heat exchange with the combustion products in the combustion chamber and nozzle. The heated liquid hydrogen becomes sufficiently heated to form a gas which is then utilized to power the power turbine in the rocket's turbopumps. After the energy is extracted from the heated hydrogen the, now, cooler hydrogen is then fed to the injector to combine with the liquid oxygen to combust in the thrust chamber and hence, develop thrust. The thrust chamber of the other liquid rocket engines that utilize liquid propellants that may not be cryogenic are also similarly constructed.

As is well known in this field of technology, there are continuing demands on these rocket engines for producing higher and higher thrust. While the regenerative cooling system as described above has been adequate for certain rocket engine models, the requirement for additional thrust which occasions higher heat loads in the thrust chamber has put increasingly higher demands on the structural integrity on the construction of these tubes and particularly on the braze of those components that are brazed and are subject to these high heat loads.

We have found that we can obviate the problems incidental to the higher temperature problems associated with the assembly and bond of these tubes providing a hook at each end of each tube that is attached to each of a pair of manifolds mounted at the top and bottom ends of the thrust chamber. The hooks are bent and configured such that the upper end of each of the tubes lie in a generally horizontal direction relative to the engine's axis and the lower end of each of the tubes lie in a generally vertical direction relative to the rocket engines center line and in fact, lie generally parallel to the rocket engine's center line. The open end of the bottom tubes face the hooks at the upper end of the tubes such that the hook is bent in a direction away from the rocket engine's nozzle and substantially greater than ninety (90) degrees and is somewhat U-shaped. This serves a dual purpose. First, it isolates the brazed ends of the cooling tubes from the heat source of the combustion products in the rocket engine's combustion chamber and nozzle. Second, this construction enhances the method of assembly of the cooling tubes to the manifolds that are typically employed with the tubes. The vertical portion of the bottom end of the tubes permit the manifold which may be a full hoop or segmented and joined near the throat section of the thrust chamber and then lowered vertically onto each of the vertical ends of the tubes after the horizontal ends have been assembled into the upper manifold. A wedge ring supporting the bottom manifold is lowered along the thrust chamber and ultimately engages and bears against the outer periphery of the tubes so as to provide a precise fit between the manifold and the outer diameter of the tubes that are configured into the tubular shaped thrust chamber. This construction is such that the logistics of the brazed portions places the brazed ends of the tubes away from the high temperature portion of the thrust chamber and in a relatively cold environment which enhances the strength and or durability of the thrust chamber and nozzle which inherently enhances the fatigue life of the component parts.

The location of the manifold of this construction lends itself to provide means for defining a base to support the rocket engine for storage purposes. This invention contemplates forming integrally with or attaching to the bottom manifold a skirt that has a horizontal planar bottom surface that forms a base to support the engine in an upright position for storage or installation purposes.

SUMMARY OF THE INVENTION

An object of this invention is to provide an improved tube construction for a rocket engine.

Another object of this invention is to provide thrust chamber tubes with hooked ends that are characterized as easy to manufacture and assemble, locate the braze joints of the assembly in a relative cool environment and enhance the strength of the thrust chamber.

A feature of this invention is to provide in the propellant cool tubes that define the thrust chamber and nozzle of the rocket engine hooked portions at either end so as to 1) isolate the brazed joints from the heat of the rocket thrust chamber and to 2) facilitate the assembly of the manifolds.

A still further feature of this invention is to provide a method of construction and assembly of the manifolds and tubes by bending the ends of the tubes that assemble to the lower or inlet manifold such that the bend is away from the thrust chamber and lies generally vertical or generally parallel to the engine's center line, and providing either a full hoop wedge ring and manifold in one embodiment or segmented wedge ring/manifold sub-assembly that is joined together, in situ, at a smaller diameter location of the rocket thrust chamber in another embodiment. In both embodiments the manifold is located above the ends of the vertical portions of the tubes prior to assembly and the wedge ring/manifold sub-assembly is lowered onto the tubes so that complementary apertures in the manifold align with and accept the vertical ends of the tubes, so that the wedge relative to the manifold and the outer peripheral surface of the tubes and tube ends relative to the apertures form a precise fit and then brazing the entire assembly in situ.

The foregoing and other features of the present invention will become more apparent from the following description and accompanying drawings.

BEST MODE FOR CARRYING OUT THE INVENTION

For the sake of simplicity and convenience a description of the operation and details of the rocket engine is omitted herefrom but further details may be had by referring to U.S. Pat. No. 3,516,254 granted to R. M. Hammond on Jun. 23, 1970 entitled "Closed-Loop Rocket Propellant Cycle", U.S. Pat. No. 4,912,925 granted to R. R. Foust on Apr. 3, 1990 entitled "Rocket Engine with Redundant Capabilities" and U.S. Pat. No. 5,267,437 granted to R. R. Foust on Dec. 7, 1993 entitled "Dual Mode Rocket Engine" all of which are commonly assigned to the Untied Technologies Corporation, the assignee common to the assignee of this patent application and which is incorporated herein by reference. Suffice it to say that cryogenic fuel is combusted in the combustion chamber of the thrust chamber and discharges through the nozzle of the thrust chamber. A portion of the liquid hydrogen is bled from the pump and conducted through the longitudinal tubes that define the outer shell of the thrust chamber for cooling the tubes and driving the turbopumps by virtue of the energy captured in the hydrogen in the process of cooling. The pressure and flow of the hydrogen and liquid oxygen are regulated and ultimately delivered to the injectors mixing the propellants for combustion. This invention as will be described in further detail hereinbelow deals essentially with the construction of the tubes and manifolds and the method of assembly thereof.

While this invention is being described in its preferred embodiment as being utilized in a liquid rocket engine of the type exemplified by the RL10 rocket engine, it will be understood by one skilled in this art that this invention can be utilized with all types of liquid rocket engines. It will also be appreciated that the terms "horizontal" and "vertical" as used herein define relative positions and are intended to be construed as being illustrative of general directions anti not to be construed as exacting directions.

Figure 1:
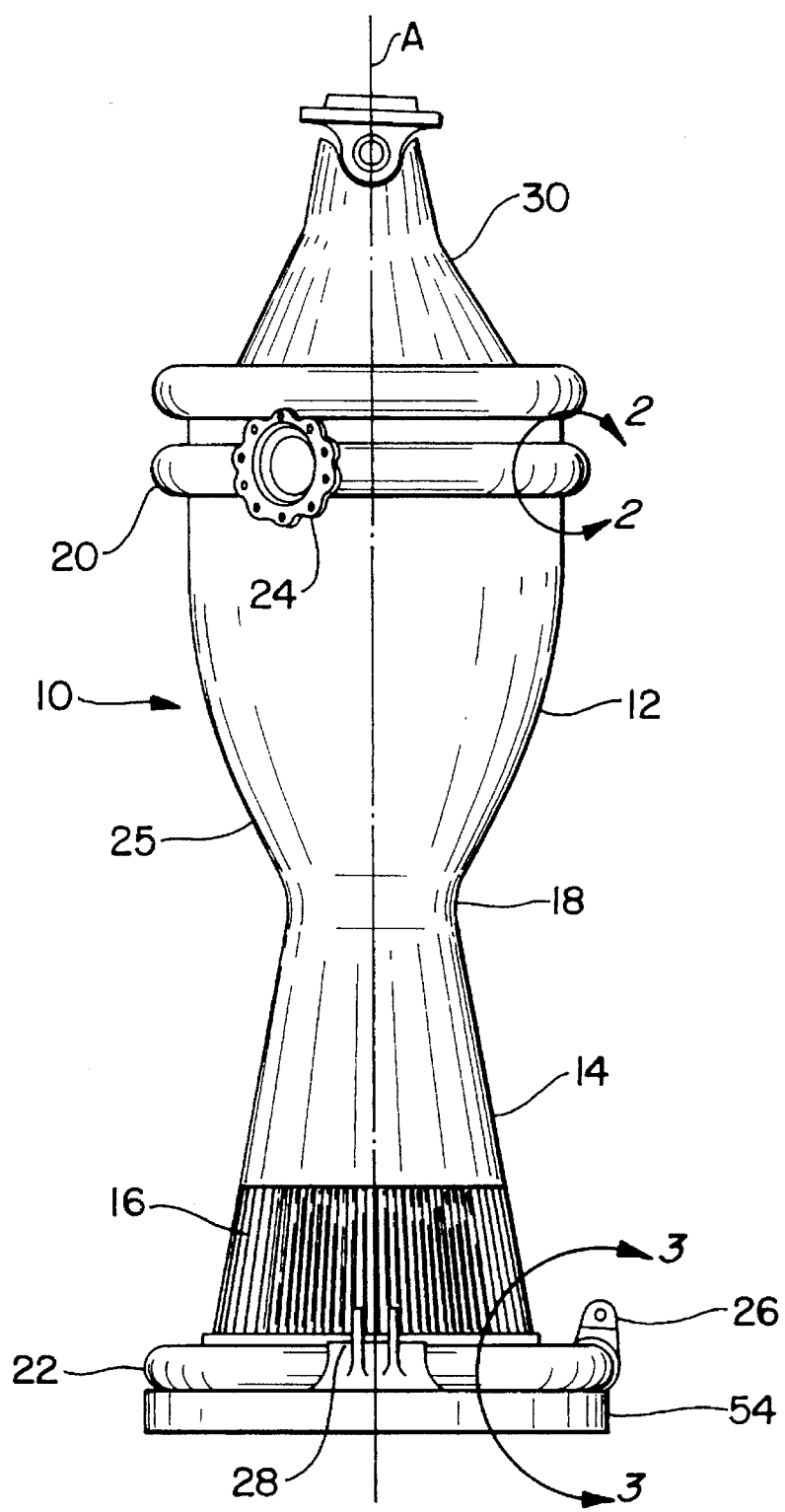
FIG. 1 is a schematic view in elevation of the thrust chamber and manifold configuration of this invention.

As best seen in FIG. 1 the thrust chamber generally illustrated by reference numeral 10 comprises a combustion chamber or zone 12 and a nozzle or nozzle section 14. The thrust chamber 10 is virtually hollow and formed by a plurality of tubes that extend from the inlet of the combustion chamber 12 to the exit or discharge end of the nozzle 14. The tubes which conform to the generally conical or bell shapes and necked down to form a throat section 18 extend virtually axially and generally parallel to the thrust chamber's center line A. Essentially, the tubes 16 extend between the upper manifold 20 which is the exit manifold and the bottom manifold 22 which is the inlet manifold. Hence, the hydrogen is piped from the hydrogen source or pump and enters the manifold 22 through an inlet (not shown) constructed identical to the flanged outlet 24 of the upper manifold 20. The hydrogen then flows upwardly as depicted in FIG. 1 toward the upper manifold 20 and is collected in this manifold and discharges through the outlet 24 and fluidly connected to the turbopumps (not shown). A reinforcement jacket 25 may be employed as a structural support that circumscribes a portion of the thrust chamber.

Although not a part of this invention, clevis are affixed to the thrust chamber as for example illustrated by reference numerals 26 and 28 to be connected to gimbals to attach the lower portion of the, thrust chamber to the space craft. The gimbal assembly 30 attaches the upper portion of the thrust chamber to the space craft.

Figure 2:
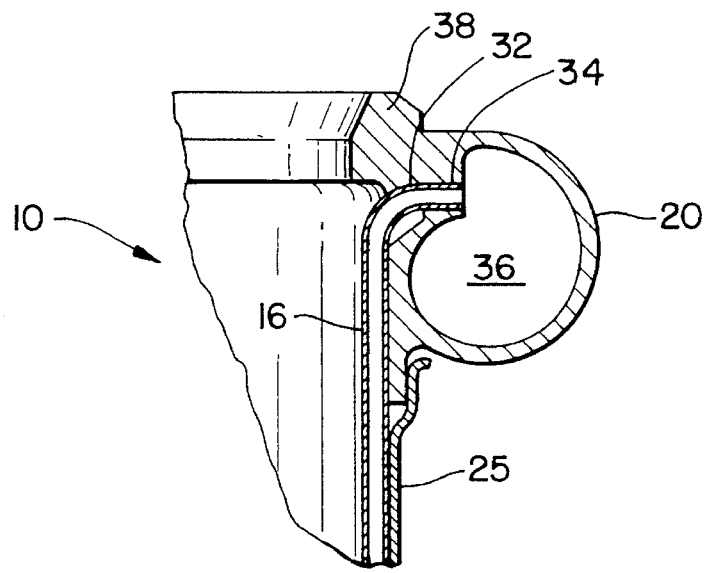
FIG. 2 is a fragmentary view in section taken through the circle 2 of FIG. 1 illustrating the upper manifold and the horizontal bent end of this invention.
Figure 3:
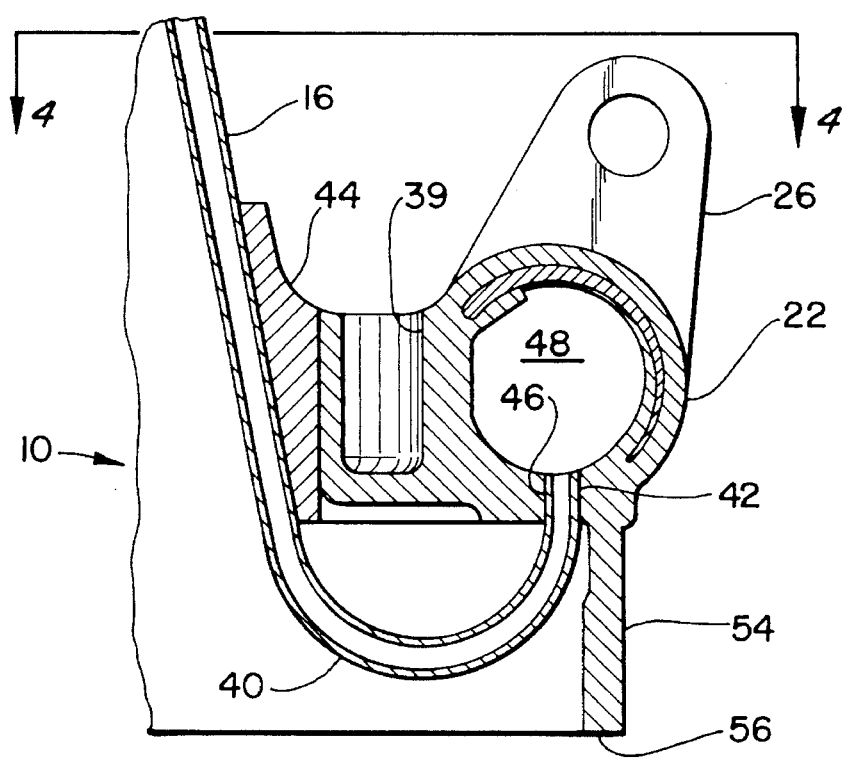
FIG. 3 is a fragmentary view in section taken through the circle 3 of FIG. 1 illustrating the lower manifold and the vertical bent end of this invention.
Figure 4:
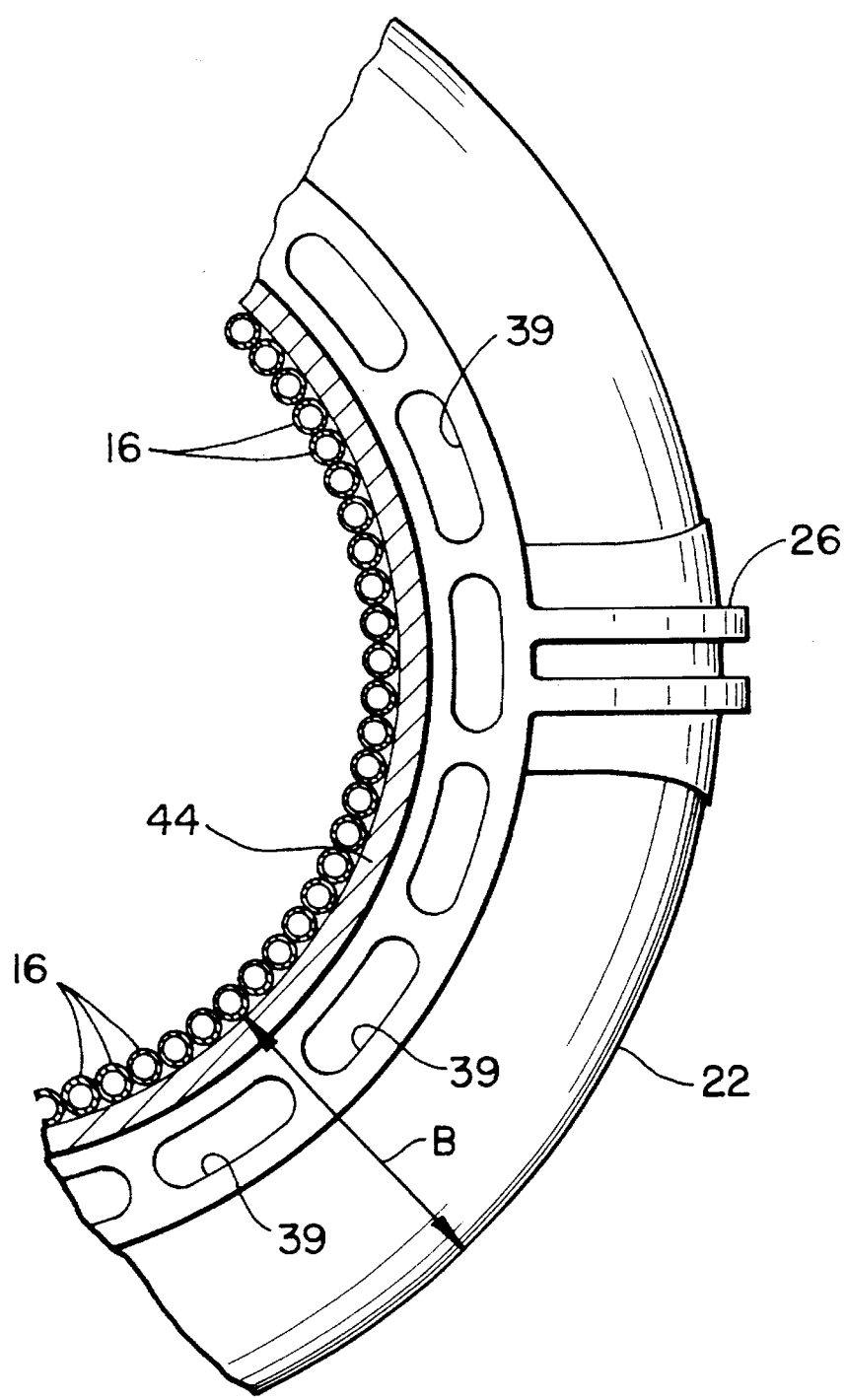
FIG. 4 is a top view partly in section taken along lines 4—4 of FIG. 3.

Reference is next made to FIGS. 2 and 3 which are fragmentary sectional views which shows the details of this invention. As noted in FIG. 2, the end of tube 16 (only one tube is shown) is bent outwardly relative to the thrust chamber 10 and lies generally horizontal or perpendicular to the rocket engine's center line A (see FIG. 1). The bent end 32 of each tube 16 is inserted in one of the apertures 34 to place the fluid in the passages of tubes 16 in fluid communication with the annular passage 36 defined by manifold 20. The bent ends 32 of all the tubes 16 circumferentially spaced around the thrust chamber to complement the apertures 34 are fitted into these apertures and then brazed. The manifold 20 is supported to the thrust chamber 10 by the annular bulk head or support ring 38.

Referring to FIG. 3 which is a fragmentary view in section illustrating the bottom end of tubes 16 (only one being shown). This end 40 is bent substantially greater than 90 degrees outwardly away from the thrust chamber 10 at the discharge end of nozzle 14 and defines a generally U-shaped portion. The open end 42 of the bent portion 40 is vertically disposed or generally parallel relative to the center line A and faces the upper manifold 20. The manifold 22 is supported to the wedge ring 44 that attaches to the outer periphery of tubes 16. The vertical open end 42 of each of tubes 16 is inserted into the aperture 46 formed on the bottom of manifold 22 to place the passages of the tubes 16 in fluid communication with the annular passage 48 of manifold 22.

As is apparent from the foregoing the hydrogen flows into manifold 22 and delivered to each of the tubes 16 via open end 42 and flows through the passages of the tubes 16 in indirect heat exchange relationship with the products of combustion in the nozzle and combustion chamber and is discharged through the end 32 of tubes 16 and collected in the manifold 20 where it delivered to the turbopump (not shown) via the exit 24 of manifold 20.

A plurality of lightening recess 39 are circumferentially spaced about the manifold 22 and may extend short of the bottom of the portion of the manifold as shown or extend completely therethrough. This serves to reduce the weight of this component.

In one embodiment the manifold and wedge ring are constructed as a full hoop and are preassembled and held above the ends of the hooks of the tubes 16. Subsequently, the manifold 22 and the wedge ring 44 are lowered into position to align with the ends of tubes 16 so that these ends fit into the apertures 46. The interfaces of the wedge ring 44 and outer periphery of tubes 16 and manifold 22 and the ends 42 of tubes 16 and the apertures 46 are precisely fitted and then brazed in situ.

In another embodiment the manifold 22 and wedge ring 44 are segmented and they and the tube assembly are constructed and assembled in a manner that will be described immediately hereinbelow. The halves of the segmented wedge ring 44 and segmented manifold 22 are first placed in position to circumscribe the thrust chamber at a location in proximity to the throat section 18 of nozzle 14 and joined say, by welding or brazing, in situ, as depicted by the weldment B. Optionally, the joining of the segments may be effectuated after assembling the manifold to the tubes. In that arrangement all the joining operations take place at the same time. The now toroidally shaped wedge ring 44 and manifold 22 are lowered to align the apertures 46 formed in manifold 22 with the ends 42 of tubes 16. This sub-assembly drops into place fitting the ends 42 into apertures 46 and the side surfaces of the outer periphery of manifold 22 align with the outer periphery of wedge ring 44 and the surfaces of the outer periphery of tubes 16 bear against the inner periphery of wedge ring 44. The tolerances of all the component parts, whether in a full hoop or segmented construction, are precisely controlled so that the surfaces of ends 42 fitting into apertures 46 and the interfaces of the wedge ring 44 with the tubes 16 and manifold 22 form a precise fit and are brazed in situ. As one skilled in this art will appreciate, this invention contemplates that the manifoldand wedge ring can be individually or collectively segmented such that in certain applications the manifold or wedge ring is segmented while the other component is a full hoop.

As noted from FIGS. 1 and 3 an annular skirt 54 is integrally formed at the bottom of manifold 22 and extends axially downward below the discharge end of nozzle 14 and circumscribes the thrust chamber. The bottom surface 56 is generally circular in shape and is planar to form a flat support surface for the thrust chamber so that it can be held upright for storage purposes.

Although this invention has been shown and described with respect to detailed embodiments thereof, it will be appreciated and understood by those skilled in the art that various changes in form and detail thereof may be made without departing from the spirit and scope of the claimed invention.

We claim:

1. A rocket engine having a thrust chamber comprising a combustion chamber having an inlet and being generally conical or bell shaped and a nozzle having an exit and being generally conical or bell shaped and defining a throat section, said thrust chamber being formed from a plurality of tubes having passages extending from adjacent to the inlet of said combustion chamber to adjacent to the exit of said nozzle comprising a first annular manifold circumscribing said thrust chamber in proximity to said thrust chamber and adjacent to said exit, each of said tubes having a first end and a second end remotely spaced from said first end, said first end fitting into and complementing a plurality of apertures formed in said first annular manifold, a second annular manifold circumscribing said nozzle and axially spaced from said first annular manifold, said second end of each of said plurality of tubes fitting into and complementing a plurality of additional apertures formed in said second annular manifold, each of said plurality of tubes having and end portion adjacent to said second end being bent in a U-shaped configuration defining a pair of legs where one of said pair of legs is in a direction spaced laterally from said nozzle and facing said first annular manifold whereby fluid first flows into said second manifold then through said tubes and into said first manifold.

2. A rocket engine as claimed in claim 1 wherein said thrust chamber is formed around a center line, said end portion of each of said plurality of tubes extending generally perpendicular relative to said center line.

3. A rocket engine as claimed in claim 2 including a wedge ring disposed between said plurality of tubes and said first annular manifold.

4. A rocket engine as claimed in claim 3 wherein said other end of said plurality of tubes being brazed to said first annular manifold adjacent said plurality of apertures whereby the braze is located in a relative low temperature environment as compared to the temperature environment of said combustion chamber.

5. A rocket engine as claimed in claim 4 wherein said wedge ring includes an inner annular surface and an outer annular surface, said inner annular surface being brazed to said plurality of tubes, and said outer annular surface being brazed to said first annular manifold.

6. A rocket engine as claimed in claim 5 including a skirt affixed to said first annular manifold and extending beyond the said exit of said nozzle, said skirt having a planar bottom surface for resting on the ground and supporting said thrust chamber in a vertical position.

7. A rocket engine as claimed in claim 6 wherein said rocket engine combusts hydrogen and oxygen in said combustion chamber, a portion of hydrogen bypassing said combustion chamber and being conducted through said second annular manifold, through said plurality of tubes and through said first annular manifold.

8. The method of constructing a thrust chamber having a central axis for a rocket engine comprising the steps of:

providing a plurality of tubes each of which extend in a generally axial direction and are in side-by-side relationship for defining a combustion chamber and a nozzle of the thrust chamber having a discharge end, attaching a first annular manifold adjacent to the combustion chamber circumscribing the thrust chamber, providing a wedge ring and a second annular manifold with an upper and lower surface, preassembling the wedge ring and the second annular manifold at a location adjacent the discharge end of the nozzle, bending the end portion of each of the tubes to form legs defining a U-shaped configuration, machining a plurality of circumferentially spaced apertures in the lower surface of the second annular manifold that complements the size and number of tubes, aligning and positioning the apertures of the second annular manifold to drop onto one of the legs of the U-shaped configured tubes so that the one of the legs of each tube fits into each of the apertures, and bonding the leg of the U-shaped configured tubes fitted into the apertures obtained in the step of aligning and positioning.

9. The method of constructing a thrust chamber for a rocket engine as claimed in claim 8 wherein the step of bonding includes brazing the wedge ring to the plurality of tubes and to the second annular manifold.

10. The method of constructing a thrust chamber for a rocket engine as claimed in claim 9 including the additional steps of:

machining a plurality of apertures in the first annular manifold, bending one end of each of the plurality of tubes to extend laterally from the thrust chamber exterior and perpendicular relative to the center line of the thrust chamber, and aligning and positioning the apertures of the second annular manifold to drop onto the leg of the U-shaped configured tubes.

11. The method as claimed in claim 10 wherein the second annular manifold and wedge ring are segmented and including the step of bonding the segments of said segmented wedge ring and the segments of the segmented second annular manifold in situ at a location adjacent between the combustion chamber and nozzle.

12. The method as claimed in claim 11 including the step of forming adjacent to the second annular manifold a skirt with a planar surface extending beneath the thrust chamber to form a base for holding the rocket engine in an upright position.

* * * * *

UNITED STATES PATENT AND TRADEMARK OFFICE
CERTIFICATE OF CORRECTION

PATENT NO. : 5,557,928

DATED : September 24, 1996

INVENTOR(S) : Castro, et al

It is certified that error appears in the above-identified patent and that said Letters Patent is hereby corrected as shown below:

```
Column 1, line 9, delete "cheer" and insert
--chamber--
Column 5,
Claim 1, line 56, delete "and" and insert
--an--
```

Signed and Sealed this

Twenty-eighth Day of January, 1997

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO.       : 5,557,928
APPLICATION NO.  : 08/291385
DATED            : September 24, 1996
INVENTOR(S)      : Joaquin H. Castro et al.

Page 1 of 1

It is certified that error appears in the above-identified patent and that said Letters Patent is hereby corrected as shown below:

Title page, item [75] inventor CASTRO, Jaoquin H. and it should read --CASTRO, Joaquin H.--

Signed and Sealed this

Fourth Day of August, 2009

JOHN DOLL
*Acting Director of the United States Patent and Trademark Office*